United States Patent [19] [11] Patent Number: 4,693,485
Kamei et al. [45] Date of Patent: Sep. 15, 1987

[54] VEHICLE HEIGHT CONTROL APPARATUS

[75] Inventors: Eiichi Kamei, Nagoya; Hideaki Namba, Oobu; Masahiro Ohba, Okazaki, all of Japan

[73] Assignee: Nippondenso Co., Ltd., Kariya, Japan

[21] Appl. No.: 826,012

[22] Filed: Feb. 4, 1986

[30] Foreign Application Priority Data

Feb. 4, 1985 [JP] Japan .................................. 60-20673

[51] Int. Cl.[4] ............................................. B60G 17/00
[52] U.S. Cl. ..................................... 280/6 R; 180/41; 280/707; 280/DIG. 1
[58] Field of Search ......... 280/6 R, 6 H, 6.1, DIG. 1, 280/707; 180/41

[56] References Cited

U.S. PATENT DOCUMENTS

| 4,266,790 | 5/1981 | Uemura et al. | 280/6.1 |
| 4,518,169 | 5/1985 | Kuroki et al. | 280/6 R |
| 4,537,411 | 8/1985 | Naramoto | 280/6 R |
| 4,568,096 | 2/1986 | Yew et al. | 280/6.1 |
| 4,595,072 | 6/1986 | Barnea | 280/6 R |

Primary Examiner—John J. Love
Assistant Examiner—Kenneth R. Rice
Attorney, Agent, or Firm—Cushman, Darby & Cushman

[57] ABSTRACT

The vehicle height control apparatus according to the present invention comprises, vehicle height detecting unit (M3) provided at an appropriate position of a vehicle (M1) for detecting the distance between a body (M2) of the vehicle (M1) and the surface of road; vehicle height adjusting members (M5) provided between the body (M2) of the vehicle (M1) and wheels (M4) of the vehicle (M1) for adjusting the height of the a vehicle (M1); vehicle height control unit (M6) for obtaining controlled variable of the vehicle height adjusting members (M5) so that the actual vehicle height detected by the vehicle height detecting unit (M3) equals the predetermined target height and for driving the vehicle height adjusting members (M5), the vehicle height control unit (M6) being formed as an integral-added optimal regulator which determines the controlled variable of the vehicle height adjusting members (M5) on the basis of an optimal feedback gain predetermined in accordance with dynamic model of the system relating to the height of the vehicle (M1).

8 Claims, 11 Drawing Figures

VEHICLE HEIGHT CONTROL APPARATUS

BACKGROUND OF THE INVENTION

This invention relates generally to vehicle height control apparatus, and, more particularly, to such apparatus which is capable of appropriate control of vehicle height in accordance with a dynamic model of a system relating to the height of a vehicle.

Various types of vehicle height control apparatus have been devised and manufactured where the vehicle height control apparatus is developed so that a vehicle always keeps a normal attitude with a given height by correcting the variation of the vehicle height due to changes in the number of passengers or the amount of load, or the stability of the vehicle by which running is improved by changing the vehicle height in accordance with the travelling state of the vehicle or the state of the road surface.

In such conventional vehicle height control apparatus, vehicle height is controlled on the basis of so called classic feedback control theory with which vehicle height is controlled in connection with each of the respective wheels by driving the vehicle height adjusting members so that the vehicle height detected by the various vehicle height sensors, which are provided for the respective wheels, equals the therefor target vehicle height.

However, since respective vehicle height adjusting members are independently controlled in the conventional vehicle height control apparatus, there has been a problem that vehicle height control at an arbitrary position cannot be effected, since the independent adjustment of one vehicle height adjusting member effects the others. Furthermore, there has been a problem in connection with response time such that it takes a relatively long period of time until a vehicle body assumes a stable attitude after control is started since vehicle height control is performed without considering the mutual interference between the respective vehicle height adjusting members, such that driving of one vehicle height adjusting member affects the other vehicle height adjusting members.

SUMMARY OF THE INVENTION

The present invention has been developed in order to remove the above-described drawbacks inherent to the conventional vehicle height control apparatus.

It is, therefore, an object of the present invention, among others, to provide a new and useful vehicle height control apparatus which is capable of controlling vehicle height in a smooth and stabile manner on the basis of so called modern control theory by controlling respective vehicle height adjusting members with the vehicle height control being considered in the context of the entire vehicle.

According to a feature of the present invention a vehicle height control unit is formed as an integral-added optimal regulator which determines the controlled variable of a vehicle height adjusting member on the basis of an optimal feedback gain predetermined in accordance with a dynamic model of the system relating to the height of a vehicle whose height is to be controlled.

BRIEF DESCRIPTION OF THE DRAWINGS

The above object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
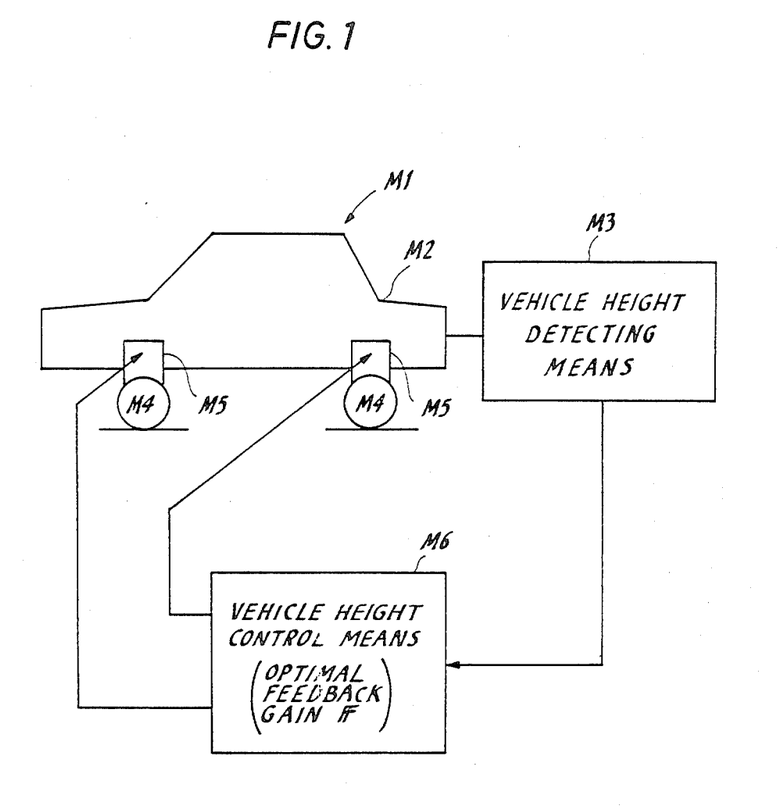
FIG. 1 is a schematic diagram showing the structure of the vehicle height control apparatus according to the present invention.

The structure of the present invention is schematically shown in FIG. 1. The vehicle height control apparatus according to the present invention comprises vehicle height detecting means M3 provided to an appropriate position of a vehicle M1 for detecting the distance between a body M2 of said vehicle M1 and the surface of road; vehicle height adjusting members M5 provided between said body M2 of said vehicle M1 and wheels M4 of said vehicle M1 for adjusting the height of said vehicle M1; vehicle height control means M6 for obtaining controlled variable of said vehicle height adjusting members M5 so that the actual vehicle height detected by said vehicle height detecting means M3 equals said predetermined target height and for driving said vehicle height adjusting members M5; characterized in that said vehicle height control means M6 is formed as an integral-added optimal regulator which determines the controlled variable of said vehicle height adjusting members M5 on the basis of an optimal feedback gain F predetermined in accordance with a dynamic model of the system relating to the height of said vehicle M1.

In the above, the vehicle height adjusting member M5 is provided between the vehicle body M2 and the wheel M4 for adjusting the vehicle height, and may be an air suspension which adjusts vehicle height using gas pressure, a hydraulic pneumatic suspension or hydraulic cylinder provided in series with conventional suspension structure independent therefrom.

As the vehicle height detecting means M3, a potentiometer may be used which detects the variation of the distance between the wheels and the vehicle body in the same manner as the above-mentioned vehicle height adjusting member M5, as a variation in electrical resistance, or an optical vehicle height sensor, where the vehicle height detecting means M4 is provided at an arbitrary position of the vehicle body M1 for detecting the distance between the vehicle body M2 and the road surface. Furthermore, an ultrasonic vehicle height sensor, which emits ultrasonic waves toward the road surface to detect a period of time required for its reflected waves to be received, may also be used.

In the above, when an air suspension system using no hydraulic pressure is used in the above-mentioned vehicle height adjusting member M5, since the spring constant is also changed by the adjustment of the vehicle height, it is preferable to use hydraulic pneumatic suspension, which is capable of controlling only vehicle height by way of hydraulic pressure, or a hydraulic cylinder provided in series with a suspension structure independent therefrom.

The vehicle height control means M6 is arranged to transmit a control signal to the vehicle height adjusting member M5 so that the vehicle height equals the target vehicle height in receipt of a detection signal from the vehicle height detecting means M3. The vehicle height control means M6 comprises a microcomputer having a microprocessor, a ROM, a RAM, peripheral elements, and input/output circuits. In constrast with conventional vehicle height control apparatus, the vehicle height control means M6 is arranged to output the control signal by obtaining the controlled variable of the vehicle height adjusting member M5 on the basis of an optimal feedback gain F determined in accordance with a dynamic model of the system relating to the height of the vehicle M1.

More specifically, the vehicle height control means M6 is formed as an integral-added optimal regulator which determines an optimal controlled variable using a predetermined target vehicle height and actual vehicle height detected by the vehicle height detecting means M3. The above-mentioned target vehicle height may be a given value or may be determined by various vehicle travelling states, such as vehicle speed, steering angle, and the inclination of road surface. In this case, the height of the vehicle is suitably set in accordance with the travelling state of the vehicle and thus it is possible to improve the stability in travelling and steering and to provide a more comfortable ride.

A method of constituting such integral-added optimal regulator is described in detail in documents, such as "Linear System Control Theory" written by Katsuhisa FURUTA published by Shokodo Japan in 1976. An outlook for the method of actually forming of such regulator will be given hereinbelow. In the following description, the references F, X, A, B, C, y, u, L, G, Q, R, T, P indicate vectors (matrix), a superscript $T$ such as $A^T$ indicating transposed matrix, a superscript $-1$ such as $A^{-1}$ indicating inverse matrix, a symbol $\_$ such as $\overline{X}$ indicating an estimate, a symbol $-$ such as $\overline{C}$ indicating an amount handled by another system, i.e. a state observer (which will be simply referred to as observer hereinafter) which amount is generated by way of transform or the like from the system which is controlled object, a symbol * such as y* indicating a target value respectively.

It is known in modern control theory that in the control of a controlled object, i.e. the control of the height of the vehicle M1 in this case, the dynamic behavior of the controlled object is described in a discrete-time system as:

$$X(k) = A \cdot X(k-1) + B \cdot u(k-1) \quad (1)$$

$$y(k) = C \cdot X(k) \quad (2)$$

The above Eq. (1) is called a state equation, and Eq. (2) is called an output equation, and the term X(k) indicates state variables which represent the internal state of the system relating to the height of the vehicle M1, the term u(k) indicates vectors comprising variables indicative of the driving condition of the respective vehicle height adjusting members M5, and the term y(k) indicates vectors comprising vectors representative of vehicle height (actual vehicle height) at an arbitrary position of the vehicle M1 detected by the vehicle height detecting means M2. Eqs. (1) and (2) are both described in the discrete-time system, and a subscript "k" indicates that the value is of the present time, while a subscript "k−1" indicates that the value is of an instant that is one sampling cycle before the present time.

The state variable X(k) indicating the internal state of the vehicle M1 represents information relating to the history of the system which is necessary and sufficient for predicting the influence in the future in the control system. Therefore, the dynamic model of the system relating to the height of the vehicle M1 will be clear, and if we can determine vectors A, B and C of Eqs. (1) and (2), then it is possible to optimally control the height of the vehicle using the state variables X(k).

It is difficult to accurately and theoretically obtain dynamic models of a complex object such as an automobile in which respective vehicle height adjusting members M5 influence the vehicle height as well as the vehicle attitude, and, therefore, it is necessary to obtain the same through experiments. This is a method of constructing a model, which method is so called system identification, and in the case that the vehicle M1 is left or driven under a given condition, the model is constructed according to state equation (1) and output equation (2) with which a linear approximation is satisfied around the given condition. Therefore, even in the case that the dynamic model related to the height of the vehicle M1 is nonlinear, a linear approximation can be performed by dividing into a plurality of conditions, i.e., weight due to passengers and load or travelling condition or the like, and therefore it is possible to determine each dynamic model.

If the controlled object is of a type such that a physical model can be relatively easily constructed, as in the case of a monocycle, then the model (i.e. vectors A, B, and C) of a dynamic system can be determined through system identification which can be made through a method such as frequency response determination or spectrum analysis. However, in the case of a controlled object of a multivariable system, such as an automobile having a plurality of vehicle height adjusting members M5, it is difficult to make a physical model which is accurately approximated, and in such a case, the dynamic model is constructed through the least squares method, instrumental variable method or on-line identification.

Once a dynamic model is determined, an amount of feedback is determined from the state variables X(x), the variables y(k) of the actual height of the vehicle M1 and its target value y (k), so that the controlled variables u(k) of the condition of driving the vehicle height adjusting members M5 are theoretically and optimally determined. In the system for controlling the height of the vehicle M1, as variables directly influencing the height of the vehicle M1, the dynamic behavior of a shock absorber provided between the vehicle body M2 and the wheels M4 together with the vehicle height adjusting members M1, for instance, or the moving speed of the fluid of a hydraulic cylinder may be treated as the state variables X(k). However, most of such variables are difficult to directly measure. Therefore, means called a state observer (observer) is formed within the control means M6 so that it is possible to estimate the state variables X(k) of the vehicle M1 using the variables of the condition of driving the respective vehicle height adjusting members M5 and a detection signal (actual vehicle height) from the vehicle height detecting means M4. This is the observer according to modern control theory, and various types of observers and their designing methods are known. These are described in detail, for instance, in "Mechanical System Control" written by Katsuhisa Furuta, published from Ohm Co. Ltd. in 1984, and the observer may be designed as a minimal order observer or a finite time settling observer in correspondence with the fashion of an applied controlled object, i.e., the vehicle M1 and apparatus for controlling the height thereof.

The vehicle height control means M6 controls and drives the vehicle height adjusting members M5, in a system expanded using measured state variables or state variables X(k) estimated by the above-mentioned observer and an accumulated value obtained by accumulating the deviations of actual vehicle height detected by the vehicle height detecting means M4 from a predetermined target value of the vehicle height, by determining an optimal feedback amount from both thereof and also from a predetermined optimal feedback gain. The accumulated value is necessary for absorbing vibrations occurring during the operation of the vehicle M1, and is a value which is necessary for varying the target vehicle height depending on the operating state of the vehicle M1. During control of a servo system, it is required generally to perform a control for cancelling steady-state error between the target value and an actual controlled variable, and this corresponds to the necessity of inclusion of $1/S^l$ (integration of $1^{th}$ order) in a transfer function. In the case that a state equation is made with the transfer function of the system being determined through system identification, as described above, it is preferable to include such an integrated amount in view of stability against noise. The accumulated value is used for the above reason. Therefore, when the accumulated value is introduced into the above-mentioned state variable X(k) to expand the system so as to determine the feedback amount from these values and a predetermined optimal feedback gain F, the controlled variables of the controlled object, i.e., the variables of the condition of driving the respective vehicle height adjusting members M1, are determined as an integral-added optimal regulator.

Next, it will be described in connection with optimal feedback gain. In an optimal regulator to which an integral element is added as described above, the way of finding a control input (the variables of the condition of driving the vehicle height adjusting members M1 in this case) which minimizes a performance index J is made clear, while it is also known that the optimal feedback gain can be obtained from a solution of Riccati equation, A, B, C matrixes of the state equation (1) and the output equation (2), and the weighted parameter used in performance index (see the above-mentioned book). In the above, the weighted parameter is initially arbitrarily given so as to change the weighing in the regulation, by the performance index J, of the behavior of the variables of the condition of driving the vehicle height adjusting members M5. It is possible to determine an optimal value through repeated simulation by changing the weighted parameter by a given amount from the behavior of the state of the vehicle height which is obtained as the result of simulation performed by a large computer with an arbitrary weighted parameter being given. As a result, an optimal feedback gain F is also determined.

Therefore, the vehicle height control means M6 in the vehicle height control apparatus according to the present invention is formed as an integral-added optimal regulator using a dynamic model relating to the height of the vehicle M1 which dynamic model is determined in advance through system identification, and the parameter of the observer therein and an optimal feedback gain F and so on are determined in advance through simulation using the dynamic model of the vehicle M1.

While it has been described that the state variable X(k) is an amount indicating the internal state of the vehicle M1, this is not required to be a variable corresponding to an actual physical amount, and, therefore, this may be designed as a vector of an appropriate order which is suitable for indicating the state of the vehicle M1.

In the vehicle height control apparatus having the above-described structure according to the present invention, the vehicle height control means M6 formed as an integral-added optimal regulator operates so as to drive the vehicle height adjusting members M5 with the controlled variable of the vehicle height adjusting members M5 being obtained so that the actual vehicle height at an arbitrary position in the vehicle M1 detected by the vehicle height detecting means M3 equals the target vehicle height. Accordingly, it is possible to control the vehicle height to be a target vehicle height all the time without being influenced by the passengers, load or travelling state of the vehicle. As a result, the steering characteristics and stability of the vehicle are ensured.

Figure 2:
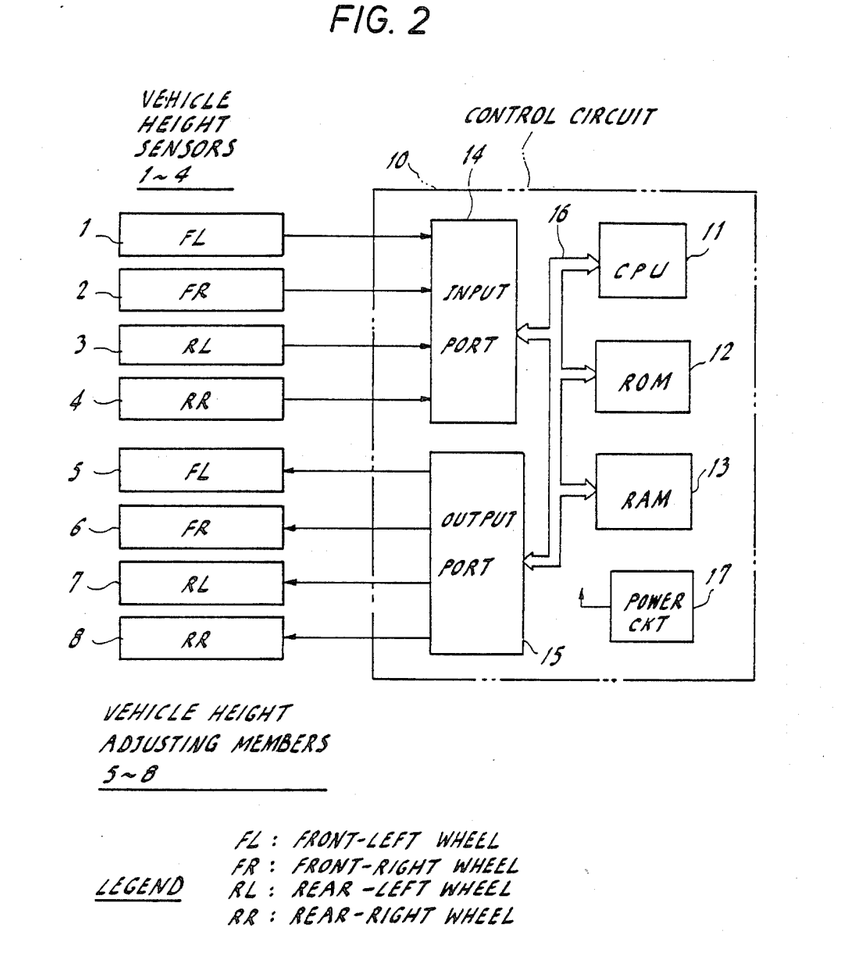
FIG. 2 is a block diagram showing the entire structure of an embodiment of the vehicle height control apparatus according to the present invention.

FIG. 2 is a block diagram showing the entire structure of an embodiment of the vehicle height control apparatus according to the present invention. The reference numerals 1 to 4 respectively indicate vehicle height sensors which are provided between respective wheels (not shown) and a vehicle body. The vehicle height sensors 1 to 4 may be potentiometers, and in detail, the reference character 1 indicating the vehicle height sensor for a front-left wheel, the reference character 2 indicating another sensor of a front-right wheel, the reference character 3 indicating another sensor for a rear-left wheel, and the reference character 4 indicating another sensor for a rear-right wheel. The reference characters 5 to 8 are vehicle height adjusting members provided between the respective wheels and the vehicle body for adjusting the vehicle height. In detail, the reference character 5 indicates a vehicle height adjusting member for the front-left wheel, the reference character 6 indicating another vehicle height adjusting member for the front-right wheel, the reference character 7 indicating another vehicle height adjusting member for the rear-left wheel, and the reference character 8 indicating another vehicle height adjusting member of the rear-right wheel.

The reference character 10 indicates a control circuit comprising a CPU 11, a ROM 12, a RAM 13, an input port 14, an output port 15, a data bus 16, a power circuit 17 and so on. Detection signals from the vehicle height sensors 1 to 4 are received by the input port 14, and the CPU 11 computes the controlled variables of the respective vehicle height adjusting members 5 to 8 in accordance with a control program prestored in the ROM 12. As a result, control signals are produced and fed from the output port 15 to the respective vehicle height adjusting members 5 to 8. In this way, a series of vehicle height control steps is executed.

Figure 3:
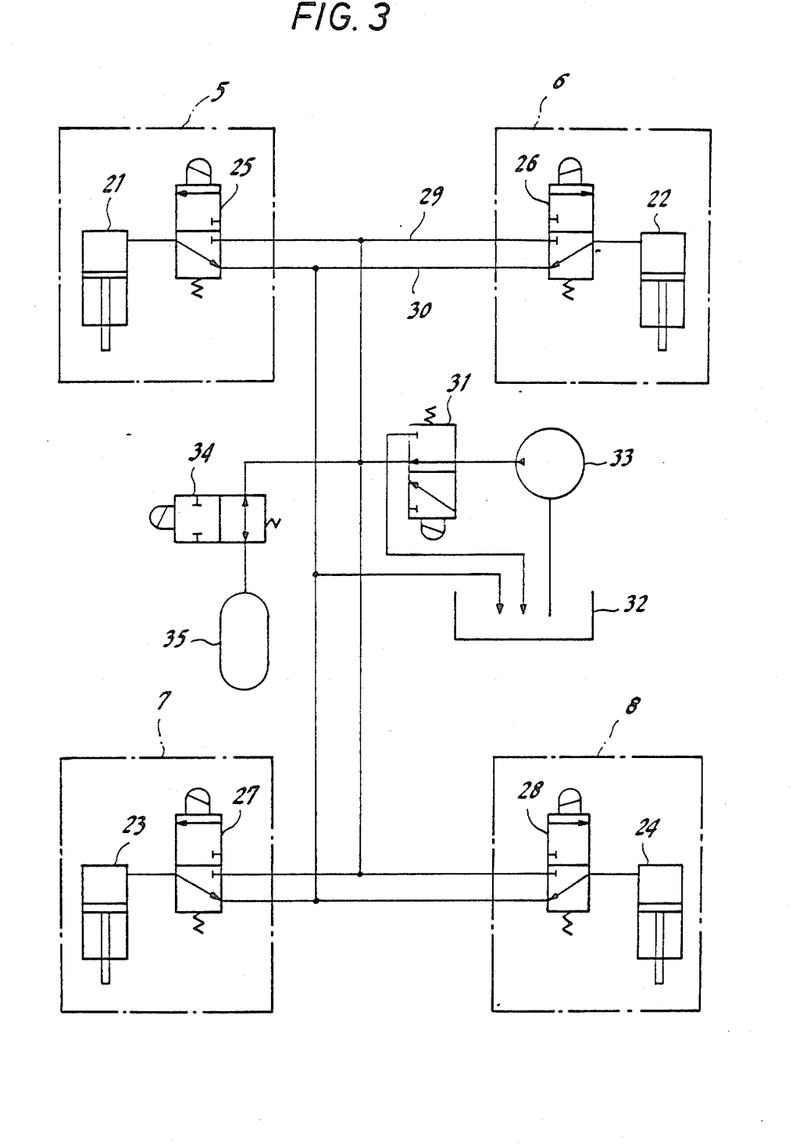
FIG. 3 is a schematic diagram showing the vehicle height control members and hydraulic system used in the embodiment.

In a preferred embodiment, a hydraulic cylinder is provided between each wheel and the vehicle body in series separately from a suspension structure as each of the vehicle height adjusting members. The vehicle height adjusting members 5 to 8 comprise hydralic cylinders 21 to 24 and electromagnetic changeover valves 25 to 28 as shown in FIG. 3. Each of the electromagnetic changeover valves 25 to 28 is driven by a drive signal from the control circuit 10 so as to make communication between an oil supply pipe 29 or drain pipe 30 and hydraulic cylinders 21 to 24 so as to adjust oil pressure in the hydraulic cylinder to control the vehicle height at the respective wheels. An oil pressure pump 33 is connected to the oil supply pipe 29 for pumping up oil stored in a reservoir 32 via an adjusting valve 31 used for adjusting oil pressure. Furthermore, an accumulator 35 for preventing pulsation of oil pressure is connected via a normally-open electromagnetic valve 34 to the oil supply pipe 29. The oil in the drain pipe 30 as well as unnecessary oil whose pressure has been adjusted by the adjusting valve 31 is returned to the reservoir 32 to be stored therein.

The period of time for communication between the respective electromagnetic changeover valves 25 to 28 and the oil supply pipe 29 or drain pipe 30 is controlled by the drive signal from the control circuit 10 so that the hydraulic pressure within the respective hydraulic cylinders 21 to 24 is controlled to a given value.

Figure 4:
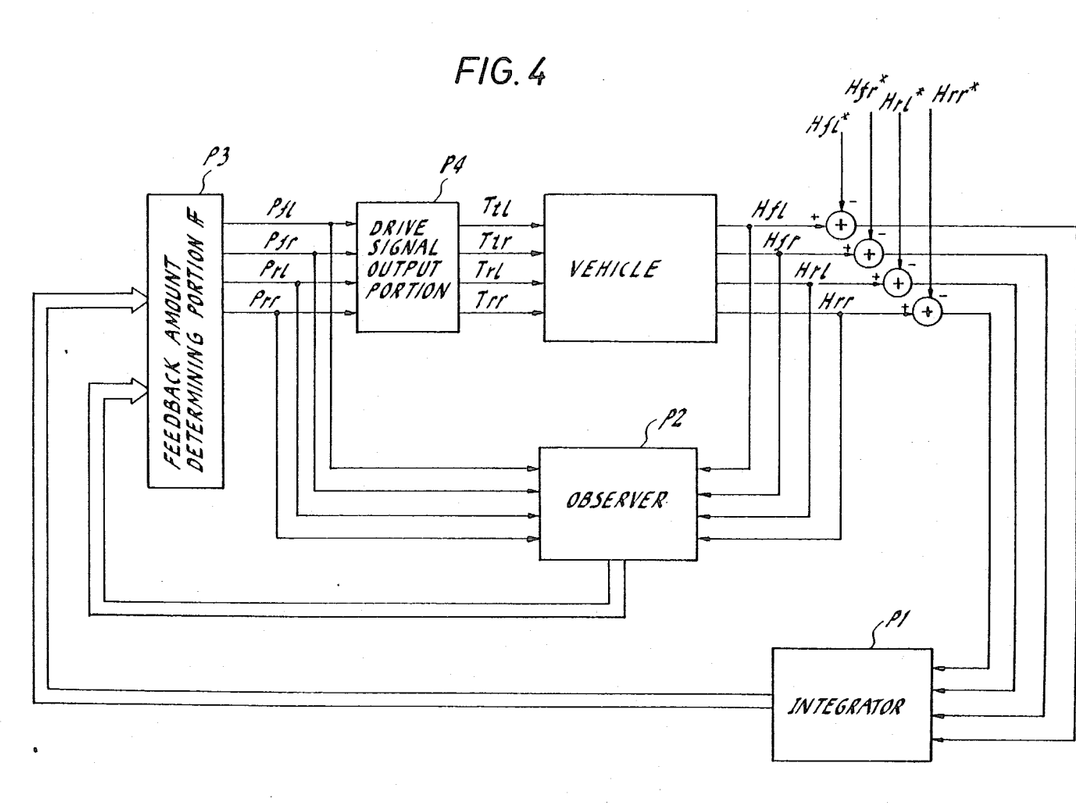
FIG. 4 is a diagram showing the control system of the embodiment.

FIG. 4 shows a control system diagram of the control circuit 10. While FIG. 4 shows the control system, the hardware structure thereof is not shown by FIG. 4. This control system is executed by a control program for vehicle height control shown in a flowchart of FIG. 8.

In FIG. 4, the references Hfl, Hfr, Hrl, Hrr represent actual vehicle heights respectively detected at the position of the respective wheels by the vehicle height sensors 1 to 4. The references Hfl*, Hfr*, Hrl*, Hrr* represent target vehicle heights predetermined in correspondence with the detected actual vehicle heights. The reference P1 is an integrator for obtaining accumulated values Zfl, Zfr, Zrl, Zrr by accumulating the deviations of the respective actual vehicle heights Hfl, Hfr, Hrl, Hrr from the respective target vehicle heights Hfl*, Hfr*, Hrl*, Hrr*. The reference P2 is an observer for obtaining state estimated variable X(k) by estimating the state variable X(k) which represents the internal state of the vehicle, i.e., the state of the suspension provided between the respective wheels and the vehicle body, or the varying state of the oil pressure within the hydraulic cylinders 21 to 24 from the detected vehicle heights Hfl, Hfr, Hrl, Hrr at the respective wheels and oil pressures Pfl, Pfr, Prl, Prr of the hydraulic cylinders 21 to 24. The reference P3 is a feedback amount determining portion for computing oil pressures Pfl, Pfr, Prl, Prr of the hydraulic cylinders 21 to 24 by obtaining the product of the accumulated values Zfl, Zfr, Zrl, Zrr obtained by the integrator P1, and an optimal feedback gain F. The reference P4 is a drive signal outputting portion which outputs drive signals Tfl, Tfr, Trl, Trr of normally-closed electromagnetic values 25 to 28 in accordance with the detected oil pressures Pfl, Pfr, Prl, Prr of the hydraulic cylinders 21 to 24.

While the structure of the control system has briefly been described hereinabove, the construction of the dynamic model through actual system identification, the designing of the observer P3, and the manner of providing the optimal feedback gain F will be described hereinbelow.

Figure 5:
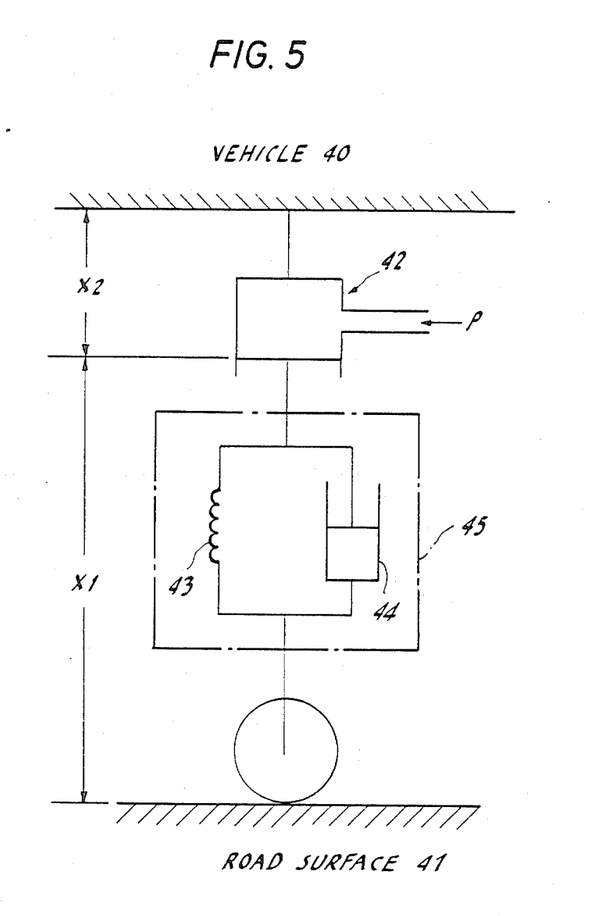
FIG. 5 is an explanatory diagram showing a physical model of the control system of a vehicle having a single wheel.

First of all, a dynamic model of the system relating to the vehicle height is constructed. For instance, in the case that the vehicle is monocycle, its physical model can be expressed, as shown in FIG. 5, by a hydraulic cylinder 42 provided between a vehicle body 40 and road surface 41 and a suspension 45 comprising a spring 43 and a damper 44. In this case, the vehicle height "h" is obtained as a sum of the length X1 of the suspension 45 and the length X2 of the hydraulic cylinder 42 as follows:

$$h(t) = X1(t) + X2(t)$$

wherein (t) indicates time function.

The dynamic behavior of the suspension 45 and the hydraulic cylinder 42 is obtained from the following equations:

$$F = P \cdot S = m1 \cdot \ddot{X}1 + f1 \cdot \dot{X}1 + k \cdot X1$$

$$F = P \cdot S = m2 \cdot \ddot{X}2 + f2 \cdot \dot{X}2$$

wherein
P is the pressure of the hydraulic cylinder;
S is the cylinder area;
m1 is mass of the suspension;
f1 is the damping coefficient of the damper;
k is the spring constant of the suspension;
m2 is the mass of the vehicle body; and
f2 is the coefficient of viscosity of the hydraulic cylinder.

Therefore, when using P(t) as an input variable, X1(t), $\dot{X}$1(t), X2(t), $\dot{X}$2(t) as state variables, and h(t) as an output variable, the state equation and the output equation of the system are respectively given as a system of the fourth order by:

$$\frac{d}{dt}\begin{pmatrix} X1 \\ \dot{X}1 \\ X2 \\ \dot{X}2 \end{pmatrix} = \begin{pmatrix} 0 & 1 & 0 & 0 \\ -k/m1 & -f1/m1 & 0 & 0 \\ 0 & 0 & 0 & 1 \\ 0 & 0 & 0 & -f2/m2 \end{pmatrix} \begin{pmatrix} X1 \\ \dot{X}1 \\ X2 \\ \dot{X}2 \end{pmatrix} + \begin{pmatrix} s/m1 \\ s/m2 \end{pmatrix}[P]$$

$$y = [1 0 1 0]\begin{pmatrix} X1 \\ \dot{X}1 \\ X2 \\ \dot{X}2 \end{pmatrix}$$

Therefore, we obtain:

$$A = \begin{pmatrix} 0 & 1 & 0 & 0 \\ -k/m1 & -f1/m1 & 0 & 0 \\ 0 & 0 & 0 & 1 \\ 0 & 0 & 0 & -f2/m2 \end{pmatrix} \quad B = \begin{pmatrix} s/m1 \\ s/m2 \end{pmatrix} \quad C = [1 0 1 0]$$

However, when the control system has four inputs and four outputs as in the present embodiment so that there is interference between variables representing the inputs and the outputs, it is difficult to derive the state equation by constructing a physical model as described above. Therefore, in the present embodiment the transfer function is obtained through a sort of simulation called system identification so as to obtain system parameters A, B and C.

Figure 6:
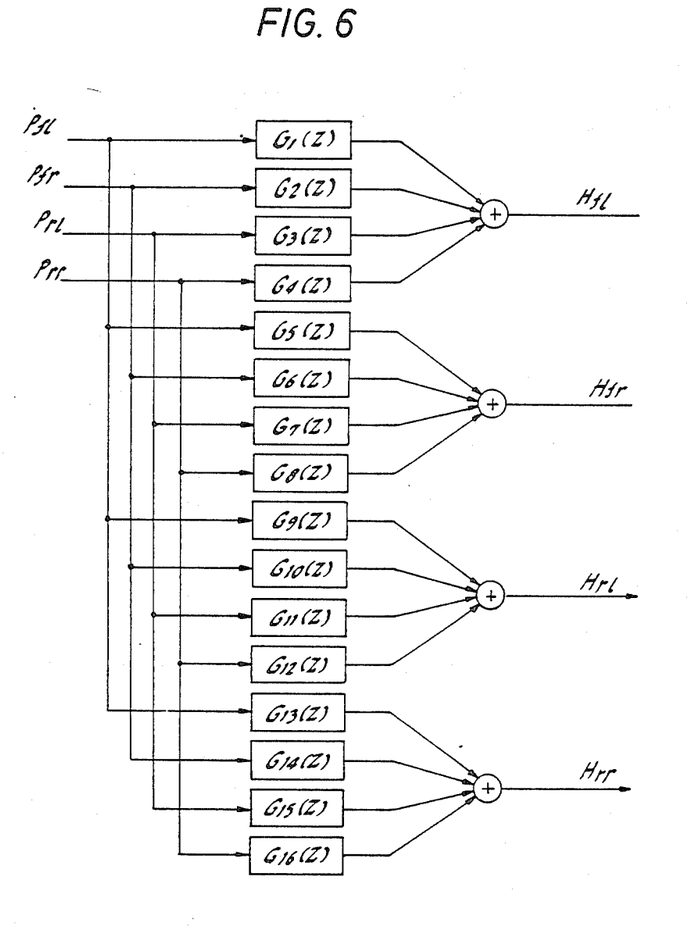
FIG. 6 is a block diagram used for identifying a system of the embodiment.

FIG. 6 is a diagram showing a control system of the present embodiment, i.e., a system having four inputs and four outputs by way of transfer functions G1(z) through G16(z). The reference z indicates z transformation of sampled values of the input/output signals, and it is assumed that G1(z) through G16(z) have appropriate order. Therefore, the entire transfer function matrix G(z) is given by:

$$G(z) = \begin{pmatrix} G1(z) & G2(z) & G3(z) & G4(z) \\ G5(z) & G6(z) & G7(z) & G8(z) \\ G9(z) & G10(z) & G11(z) & G12(z) \\ G13(z) & G14(z) & G15(z) & G16(z) \end{pmatrix}$$

The method of system identification is described in detail in "System Identification" written by Setsuo SAGARA published by Measurement and Automatic Control Society of Japan in 1981, and identification is performed here through the least squares method.

The vehicle is left or driven under a predetermined condition, and the oil pressure Pfl of the hydraulic cylinder 21 is being charged with oil pressures Pf4, Prl, Prr of remaining hydraulic cylinders 22, 23 and 24 being fixed to predetermined values. At this time, the data of the vehicle height is sampled N times. This is expressed as an input data series of $\{u(i)\} = \{Pfl(i)\}$ and as an output data series of $\{y(i)\} = \{Hfl(i)\}$ wherein $i = 1, 2, 3 \ldots N$. Here, the system can be regarded as having one input and one output, and thus the transfer function G1(z) is given by:

$$G1(z) = B(z^{-1})/A(z^{-1}) \qquad (3)$$

Therefore, $$G1(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \qquad (4)$$

In the above, $z^{-1}$ is a unit shift operator indicating $z^{-1} \cdot x(k) = x(k-1)$.

When we determine parameters a1 to an and b0 to bn of Eq. (4) from the input and output data series $\{u(i)\}$ and $\{y(i)\}$, transfer function G1(z) can be obtained. These parameters are determined in system identification using the least squares method so that the following assumes a minimal value:

$$Jo = \sum_{k=n}^{N} [\{y(k) + a1 \cdot y(k-1) + \ldots + an \cdot y(k-n)\} - \{b0 \cdot u(k) + b1 \cdot u(k-1) + \ldots + bn \cdot u(k-n)\}]^2 \qquad (5)$$

Figure 7:
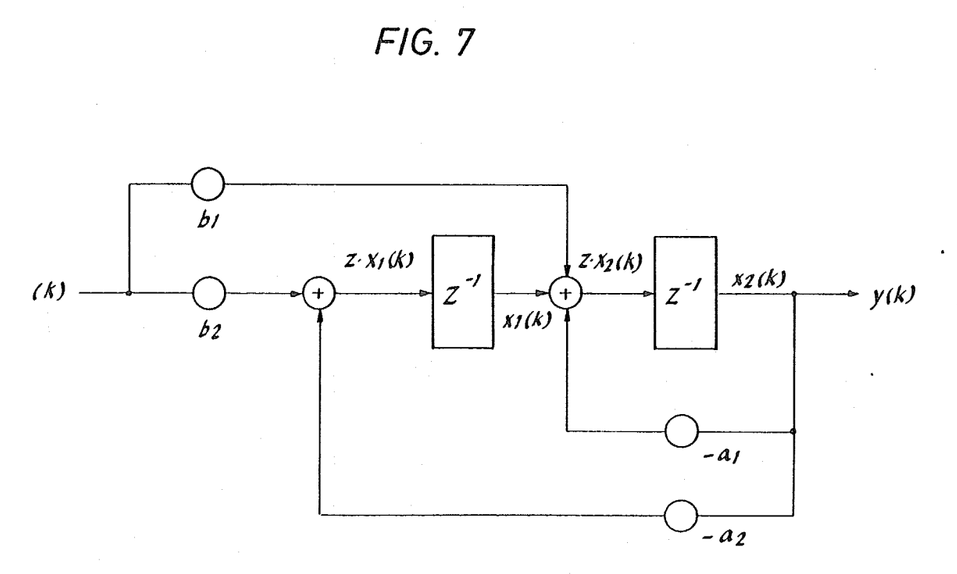
FIG. 7 is an example of a signal-flow diagram for obtaining a system parameter from transfer function.

When obtaining respective parameters assuming that n=2, a signal flow diagram of the system shown in FIG. 7 would result, and using [X1(k)] as state variables, state and output equations thereof can be expressed by Eqs. (6) and (7):

$$\begin{pmatrix} X1(k-1) \\ X2(k-1) \end{pmatrix} = z \begin{pmatrix} X1(k) \\ X2(k) \end{pmatrix} = \begin{pmatrix} 0 & -a2 \\ 1 & -a1 \end{pmatrix} \begin{pmatrix} X1(k) \\ X2(k) \end{pmatrix} + \begin{pmatrix} b2 \\ b1 \end{pmatrix} u(k) \qquad (6)$$

$$y(k) = [0 \ 1] \begin{pmatrix} X1(k) \\ X2(k) \end{pmatrix} \qquad (7)$$

Therefore, using system parameters A1', B1', C1' for the parameters A, B, C in the case that the system is regarded as of one input and one output, we obtain:

$$A1' = \begin{pmatrix} 0 & -a2 \\ 1 & -a1 \end{pmatrix} \qquad (8)$$

$$B1' = [b2 \ b1]^T$$
$$C1' = [0 \ 1]$$

In this way, the transfer functions G1(z) to G16(z) and system parameters A2' to A16', B2' to B16', C2' to C16' for each of the same can be obtained.

Now the way of designing the observer P6 will be described. While the way of designing is known as the Gopinath method, which is described in detail in "Basic System Theory" written by katsuhisa FUTURA and Akira SANO published from Corona Co. Ltd. in 1978, the observer is designed as a finite time settling observer in this embodiment.

The observer P2 is used for estimating the internal state variable X(k) of the vehicle from the vehicle heights Hfl, Hfr, Hrl, Hrr at the respective wheels, and oil pressures Pfl, Pfr, Prl, Prr of the respective hydraulic cylinders 21 to 24, and the reason why the state estimated variables (k) obtained by the observer P2 can be handled as actual state variable X(k) in the control of the vehicle height will be made clear hereinbelow. Let us assume that the output from the observer P2 is constructed as the following Eq. (9):

$$\hat{X}(k) = (A - L \cdot C) \cdot \hat{X}(k-1) + B \cdot u(k-1) + L \cdot y(k-1) \qquad (9)$$

In Eq. (9), L is a matrix arbitrarily given. Modifying Eqs. (1), (2) and (9), we obtain:

$$[X(k) - \hat{X}(k)] = (A - L \cdot C)[X(k-1) - \hat{X}(k-1)] \qquad 10)$$

Therefore, if the matrix L is selected so that an eigenvalue of the matrix $(A - L \cdot C)$ is located within a unit circle, $(k) \rightarrow X(k)$ with $k \rightarrow \infty$, and thus it is possible to accurately estimate the internal state variable X(k) of the controlled object using series $u(*), y(*)$, from the past, of the input control vector u(k) and the output vector y(k).

The vectors A, B, C of the state equation (1) and the output equation (2), both determined through system identification through the least squares method, can be similarity transformed into the following observable canonical structure considering the new state variable $\bar{X}(k) = T^{-1} \cdot X(k)$ using nonsingular matrix T because the system is observable.

$$\bar{X}(k) = \bar{A0} \cdot X(k-1) + \bar{B0} \cdot u(k-1) \qquad (11)$$

$$y(k) = \bar{C0} \cdot \bar{X}(k) \qquad (12)$$

In the above, $\overline{A0}=T^{-1}\cdot A\cdot T$, $\overline{B0}=T^{-1}\cdot B$, $\overline{C0}=C\cdot T$, and we obtain the following equations by selecting appropriate nonsingular T.

$$\overline{A0} = \begin{pmatrix} 0 & 0 & \ldots & -\alpha 1 \\ 1 & 0 & \ldots & -\alpha 2 \\ 0 & 1 & \ldots & \cdot \\ & \cdot & & \cdot \\ & & \cdot & \cdot \\ 0 & 0 & \ldots 1 & -\alpha n \end{pmatrix} \quad (13)$$

$$\overline{B0} = [\beta 1 \ \beta 2 \ \ldots \ \beta n]^T \quad (14)$$

$$\overline{C0} = [0 \ 0 \ \ldots \ 1] \quad (15)$$

Then, let L matrix be replaced as $L=[-\alpha 1 \ -\alpha 2 \ \ldots \ -\alpha n]^T$, and we can now design a finite time settling observer as follows using equations (13), (14) and (15):

$$\overline{A0} - L\cdot\overline{C0} = \begin{pmatrix} 0 & 0 & \ldots & 0 \\ 1 & 0 & \ldots & 0 \\ 0 & 1 & \ldots & 0 \\ & \cdot & & \cdot \\ & & \cdot & \cdot \\ 0 & 0 & \ldots 1 & 0 \end{pmatrix} \quad (16)$$

In the above, $\overline{A0}$, $\overline{B0}$ and $\overline{C0}$ are obtained through similarity transformation using A, B, and C, and it is also ensured that the control by the state equation is correct from this operation.

While the observer P2 has been designed using the vectors A, B and C of the state equation obtained through system identification, the output of the observer is now expressed in terms of (k) hereinafter.

Now the way of obtaining the optimal feedback gain F will be described. Since the way of obtaining optimal feedback gain F is described in detail in the above-mentioned "Linear System Control Theory", only the results are shown here with the detail thereof being omitted.

Using $$\delta u(k) = u(k) - u(k-1) \quad (17)$$

$$\delta y(k) = y(k) - y(k-1) \quad (18)$$

in connection with the operating condition variables u(k) and operating state variables y(k), obtaining an optimal control input, i.e. driving condition u*(k) of the vehicle height adjusting members (in detail, this corresponds to oil pressure of the respective hydraulic cylinders), which makes the following performance index J minimal, results in solving a control problem as an integral-added optimal regulator related to the vehicle height.

$$J = \sum_{k=0}^{\infty} [\delta y^T(k)\cdot Q\cdot \delta y(k) + \delta u^T(k)\cdot R\cdot \delta u(k)] \quad (19)$$

In the above, Q and R indicate weighted parameter matrixes, and k indicates the number of sampling times which is zero at the time of the beginning of control, while the right side of Eq. (19) is an expression of so called quadratic form using diagonal matrixes of Q and R.

Here, the optimal feedback gain F is given as follows:

$$F = -(R+\overline{B}^T\cdot P\cdot\overline{B})^{-1}\cdot\overline{B}^T\cdot P\cdot\overline{A} \quad (20)$$

In Eq. (20), $\overline{A}$ and $\overline{B}$ are given by:

$$\overline{A} = \begin{pmatrix} 1 & -\overline{C0}\cdot\overline{A0} \\ 0 & \overline{A0} \end{pmatrix} \quad (21)$$

$$\overline{B} = \begin{pmatrix} -\overline{C0}\cdot\overline{B0} \\ \overline{B0} \end{pmatrix} \quad (22)$$

Furthermore, P is a solution of the following Riccati equation:

$$P = \overline{A}^T\cdot P\cdot\overline{A} - \overline{A}^T\cdot P\cdot\overline{B}\cdot(\overline{B}^T\cdot P\cdot\overline{B}+R)^{-1}\cdot \quad (23)$$

$$\overline{B}^T\cdot P\cdot\overline{A} + \begin{pmatrix} Q\cdot 0 \\ 0 & 0 \end{pmatrix}$$

In the above, the performance index J in Eq. (19) has a meaning that it is intended to reduce the deviation of the state variables y(k) of the vehicle state as a control output, i.e., vehicle heights Hfl, Hfr, Hfl, Hrr at the respective wheels, from the target value y*(k), i.e. Hfl*, Hfr*, Hfl*, Hrr*, with the variables as the control inputs to the vehicle, i.e., oil pressures Pfl, Pfr, Prl, Prr, being regulated. The weighting of the regulation of the respective vehicle heights Hfl, Hfr, Hrl, Hrr can be altered by changing the values of the weighted parameter matrixes Q and R. Therefore, the state variables X(k) can be obtained as state estimated variables (k) using Eq. (9) if we obtain the optimal feedback gain F using Eq. (20) by obtaining P solving Eq. (23) with arbitrarily weighted parameter matrixes Q, R being selected using the dynamic model relating to the vehicle height, i.e., matrixes A, B, C (which correspond to the above-mentioned $\overline{A}$, $\overline{B}$, $\overline{C}$) which is obtained in advance. Therefore, the variables u(k) of the control input to the vehicle can be obtained as follows:

$$u(k) = F\cdot[\hat{X}(k)^T \ ZHfl(k) \ ZHfr(k) \ ZHrl(k) \ ZHrr(k)]^T \quad (24)$$

By repeating simulation with the weighted parameter matrixes Q and R being altered until an optimum control characteristic is obtained, the optimal feedback gain F is obtained.

While it has been described about the construction of the dynamic models of the height control system of the vehicle made through system identification using the least squares method, the designing of the finite time settling observer and the computation of the optimal feedback gain F, these are obtained in advance so that actual control is performed within the electronic control circuit 10 using only the results thereof.

Figure 8:
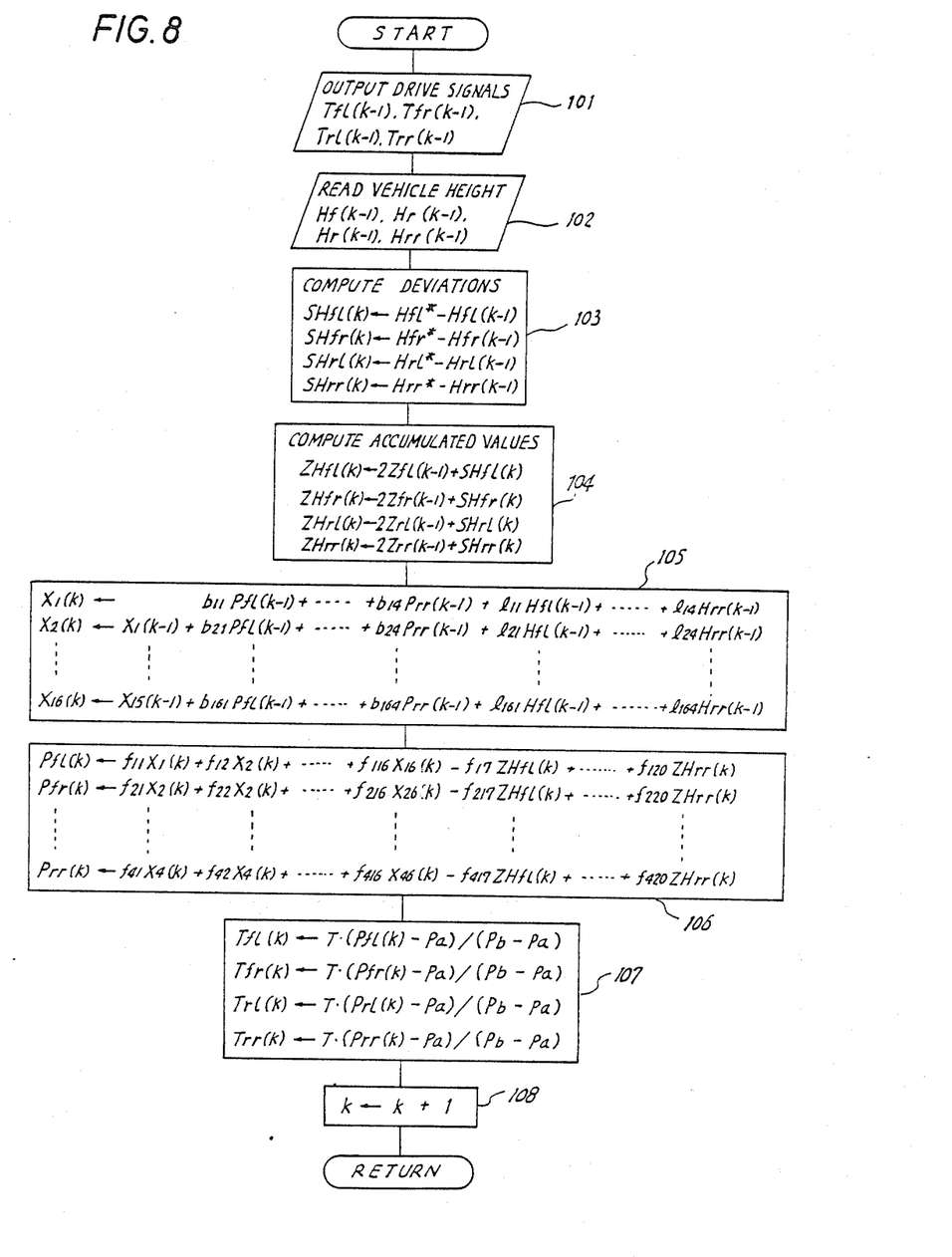
FIG. 8 is a flowchart showing the control program of the embodiment.

Now, an actual control performed by the electronic control circuit 10 will be described with reference to the flowchart of FIG. 8. In the following description, an amount handled in a present processing is expressed by a subscript (k) and an amount handled in the latest cycle by another subscript (k-1).

When the ignition switch of the vehicle is turned on to supply electrical power to the control circuit 10, the CPU 11 executes repeatedly step 101 and the following steps. As the processing is started, at first in the step 101, drive signals Tfl(k-1), Tfr(k-1), Trl(k-1), Trr(k-1) of the electromagnetic changeover valves 25 to 28 obtained by the last series of processings are outputted to the respective electromagnetic valves so as to control the oil pressure of the respective hydraulic cylinders. Then in step 102, the heights Hfl(k-1), Hfr(k-1), Hrl(k-1), Hrr(k-1) of the vehicle at the respective wheels are read from the detection signals from the respective vehicle height sensors 21 to 24, and then the operational flow proceeds to step 103.

In the step 103, the deviations of the above-mentioned read vehicle heights, i.e., actual heights Hfl, Hfr, Hrl, Hrr, from target vehicle heights Hfl*, Hfr*, Hrl*, Hrr* which are preset and prestored in the ROM 12, are computed as SHfl(k-1), SHfr(k-1), SHrl(k-1), SHrr(k-1). Then the operation flow proceeds to a step 104.

In the step 104, the respective deviations obtained in the step 103 are now accumulated to obtain accumulated values ZHfl(k), ZHfr(k), ZHrl(k), ZHrr(k) by adding the above-mentioned obtained deviations SHfl(k-1), SHfr(k-1), SHrl(k-1), SHrr(k-1) to former accumulated values ZHfl(k-1), ZHfr(k-1), ZHrl(k-1), ZHrr(k-1) which have been obtained by the latest processing. The processing corresponds to the integrator P1 shown in FIG. 4.

In a following step 105, a new state variable (k) is computed using parameters $\overline{A0}$, $\overline{B0}$, L within the observer prestored in the ROM 12 after being obtained through the above-mentioned method, the actual vehicle heights Hfl(k-1), Hfr(k-1), Hrl(k-1), Hrr(k-1) read in the step 102, state variable $\tilde{X}(k-1) = [X1(k-1)\ X2(k-1)\ldots X6(k-1)]$ obtained by the former or latest processing, and oil pressures Pfl(k−1), Pfr(k−1), Prl(k−1), Prr(k−1) of the respective hydraulic cylinders 21 to 24 detected in the latest cycle. This processing corresponds to the observer P2 shown in FIG. 4, and this observer P2 is constructed as a finite time settling observer.

The state estimated variable (k) is computed as follows:

$$X(k) = MX(k-1) + \overline{B0}(k-1) + LY(k-1) \quad (25)$$

$$= MX(k-1) + \overline{B0}\ [Pfl(k-1)\ Pfr(k-1)\ Prl(k-1)\ Prr(k-1)] + L[Hfl(k-1)\ Hfr(k-1)\ HPrl(k-1)\ Hrr(k-1)]$$

wherein $M = \overline{A0} - L\overline{C0}$.

In a following step 106, oil pressures Pfl(k), Pfr(k), Prl(k), Prr(k) of the respective hydraulic cylinders 21 to 24 by performing vector multiplication between the state estimated variable (k) obtained in the step 105, the accumulated values ZHfl(k), ZHfr(k), ZHrl(k), ZHrr(k) obtained in the step 104, and the optimal feedback gain F $$\begin{pmatrix} f11 & f12 & \ldots & f16 & f17 & f18 & f19 & f110 \\ f21 & f22 & \ldots & f26 & f27 & f28 & f29 & f210 \\ f31 & f32 & \ldots & f36 & f37 & f38 & f39 & f310 \\ f41 & f42 & \ldots & f46 & f47 & f48 & f49 & f410 \end{pmatrix}$$

preset and prestored in the ROM 12 as follows:

$$[Pfl(k)\ Pfr(k)\ Prl(k)\ Prr(k)] =$$

-continued
$$F\ [X(k)^T\ ZHfl(k)\ ZHfr(k)\ ZHrl(k)\ ZHrr(k)]^T$$

This processing corresponds to the feedback amount determining portion P3 of FIG. 4.

In a following step 107, drive signals Tfl(k), Tfr(k), Trl(k), Trr(k) for driving the normally-closed electromagnetic valves 25 to 28 are computed so that the oil pressures of the hydraulic cylinders 21 to 24 equal the above-mentioned obtained oil pressures Pfl(k), Prf(k), Prl(k), Prr(k) from the following equations:

$$Tfl(k) = T \cdot (Pfl(k) - Pa)/(Pb - Pa)$$

$$Tfr(k) = T \cdot (Pfr(k) - Pa)/(Pb - Pa)$$

$$Trl(k) = T \cdot (Prl(k) - Pa)/(Pb - Pa)$$

$$Trr(k) = T \cdot (Prr(k) - Pa)/(Pb - Pa)$$

Then the operational flow goes to a step 108.

In the above equations, the reference Pa indicates the pressure of the drain pipe (atmospheric pressure), the reference Pb indicating the pressure of the oil supply pipe, and the reference T indicating a predetermined control period of the electromagnetic changeover valve.

Figure 9:
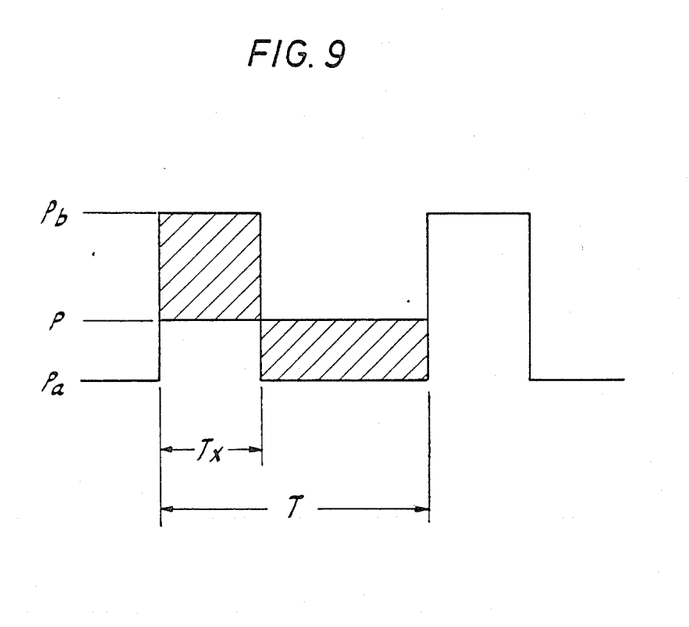
FIG. 9 is a graph for describing a drive signal of an electromagnetic changeover valve.

More specifically, the electromagnetic changeover valves are driven and controlled through duty cycle control, as shown in FIG. 9 for instance, when drive signals are being outputted for a period of time Tx within a predetermined period of time T, an average pressure within the hydraulic cylinders becomes:

$$P = \frac{Tx}{T}(Pb - Pa) + Pa$$

Therefore, assuming that the average pressure P is the target pressure, the driving period of time Tx per the predetermined period of time T can be obtained through the following equation:

$$Tx = T \cdot (P - Pa)/(Pb - Pa)$$

Then in a following step 108, the value of "k" indicative of the number of times of sampling is incremented by 1, and the operational flow returns to the step 101 to execute the above-mentioned series of processing again.

Figure 10A:
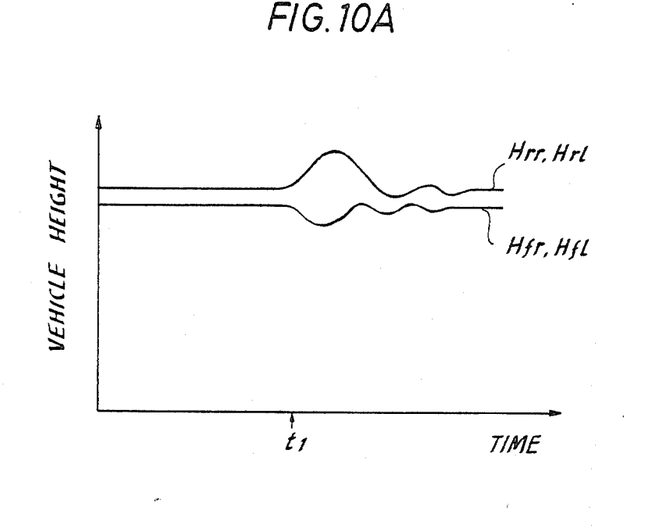
FIG. 10 is a graph for the comparison of the control characteristic by a conventional apparatus and that by the embodiment of the present invention.
Figure 10B:
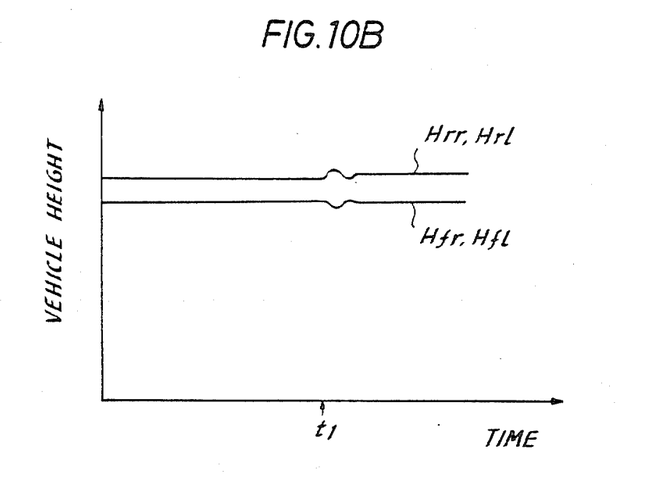

As the control is continued, the control circuit 10 performs vehicle height control with an optimal feedback gain as an integral-added optimal regulator which controls the actual vehicle heights at the respective wheels to target vehicle heights. Accordingly, in the vehicle height control apparatus according to the present invention, as shown in FIGS. 10A and 10B, the vehicle height can be controlled to a target vehicle height during braking, for instance, quickly and accurately when compared with conventional vehicle height control apparatus. As a result, the stability in running of the vehicle can be improved. FIG. 10A shows the varying state of the vehicle height controlled by the conventional vehicle height control apparatus during braking, while FIG. 10B shows the same controlled by the present embodiment of the invention. In FIGS. 10A and 10B, the reference t1 indicates a starting point of braking.

In the above-embodiment, although it has been described that the target vehicle height is predetermined, this target vehicle height may be set in accordance with various values, such as the steering angle, vehicle speed or acceleration/deceleraton, so that vehicle attitude can be controlled in a stable manner suitable to the running state and, therefore, the stability during vehicle running can be improved.

Furthermore, although the vehicle height sensors are provided at each of the wheels in the above-described embodiment so that the vehicle height at the respective wheels are controlled to be equal to the target vehicle heights, the vehicle height sensor(s) is(are) may be installed at an arbitrary position of the vehicle body. For instance, the vehicle height sensor may be installed at the driver's seat. In this case, the control system is actualized as a four-input and one-output system, and the observer and the optimal feedback gain are set accordingly.

The above-described embodiment is just an example of the present invention, and therefore, it will be apparent for those skilled in the art that many modifications and variations may be made without departing from the scope of the present invention.

What is claimed is:

1. A vehicle height control apparatus, comprising:
   (a) a plurality of vehicle height adjusting members for controlling the height of a vehicle at front and rear positions of said vehicle in accordance with various control signals;
   (b) vehicle height detecting means for producing vehicle height detection signals by detecting the height of said vehicle at front and rear positions of said vehicle;
   (c) first means for obtaining differences between predetermined target adjustment values and vehicle heights respectively represented by said vehicle height detection signals from said vehicle height detecting means; and
   (d) second means for obtaining a state variable by estimating an internal state of each of said vehicle height adjusting members, on the basis of said control signals and said respective vehicle height detection signals, which internal state varies momentarily after the application of said control signal; and
   for producing said respective control signals for the momental vehicle height adjustment on the basis of said state variable, an integrated value obtained by integrating said differences, and a predetermined optimal feedback gain.

2. A vehicle height control apparatus as claimed in claim 1, wherein said second means comprises:
   (a) a state observing unit for estimating state variables of appropriate order indicative of the dynamic internal state of the system from actual vehicle height detected by said vehicle height detecting means and controlled variable of said vehicle height adjusting members using parameters predetermined by a dynamic model of the system relating to the height of said vehicle;
   (b) an accumulating unit for obtaining an accumulated value of integrated value of the deviations of said actual vehicle height detected by said vehicle height detecting means from a predetermined target vehicle height; and
   (c) a controlled variable determining unit for determining controlled variable of said vehicle height adjusting members from said estimated state variable, said integrated value or said accumulated value, and said predetermined optimal feedback gain.

3. A vehicle height control apparatus comprising:
   (a) a plurality of vehicle height adjusting members for controlling the height of a vehicle at left and right positions of said vehicle in accordance with various control signals;
   (b) vehicle height detecting means for producing vehicle height detection signals by detecting the height of said vehicle at left and right positions of said vehicle;
   (c) first means for obtaining differences between predetermined target adjustment values and vehicle heights respectively represented by said vehicle height detection signals from said vehicle height detecting means; and
   (d) second means for storing optimal feedback gains determined by dynamic models of transfer function including the degree of interaction by one of said vehicle height adjusting members to the other vehicle height adjusting member result from the vehicle height adjustment effected by the application of a control signal to the first-mentioned vehicle height adjusting member, said transfer function also representing the relationship between the control signal to be applied to said vehicle height adjusting member and the variation in height;
   for obtaining a state variable by estimating an internal state of each of said vehicle height adjusting members, on the basis of said control signals and said respective vehicle height detection signals, which internal state varies momentarily after the application of said control signals; and
   for producing said respective control signals for the momental vehicle height adjustment on the basis of said state variable, an integrated value obtained by integrating said differences, and said optimal feedback gain.

4. A vehicle height control apparatus comprising:
   (a) a plurality of vehicle height adjusting members operated in response to respective control signals;
   (b) vehicle height detecting means for producing vehicle height detection signals each representing a vehicle height at a wheel whose position corresponds to one of said vehicle adjusting members;
   (c) difference computing means for obtaining differences between predetermined target adjustment values and vehicle heights respectively represented by said vehicle height detection signals from said vehicle height detecting means; and
   (d) feedback control means for storing optimal feedback gains determined by dynamic models of transfer function, which is a sum of the relationship between the control signal to be applied to said vehicle height adjusting member and the variation in height, and the degree of interaction by one of said vehicle height adjusting members to another of said vehicle height adjusting members resulted from the vehicle height adjustment effected by the application of a control signal to the first-mentioned vehicle height adjusting member;
   for obtaining a state variable by estimating an internal state of each of said vehicle height adjusting members, on the basis of said control signals and said respective vehicle height detection signals, which internal state varies momentarily after the application of said control signal; and for producing said respective control signals for the momental vehicle height adjustment on the basis of said state variable, an integrated value obtained by integrating said differences, and said optimal feedback gain.

5. A vehicle height control apparatus as claimed in claim 4, wherein said feedback control means comprises:
(a) a state observing unit for estimating state variables of appropriate order indicative of dynamic internal state of the system from actual vehicle height detected by said vehicle height detecting means and controlled variable of said vehicle adjusting members using parameters predetermined by dynamic models of the system relating to the height of said vehicle;
(b) an accumulating unit for obtaining an accumulated value of integrated value of the deviations of said actual vehicle height detected by said vehicle height detecting means from a predetermined target vehicle height; and
(c) a controlled variable determining unit for determining controlled variable of said vehicle height adjusting members from said estimated state variable, said integrated value or said accumulated value, and said predetermined optimal feedback gain.

6. A vehicle height control apparatus as claimed in claim 4, wherein each of said vehicle height adjusting members comprises a hydraulic cylinder driven by an electromagnetic changeover valve whose duty cycle is arranged to be controlled by a drive signal from said vehicle height control means.

7. A vehicle height control apparatus as claimed in claim 4, wherein said vehicle height adjusting members are arranged in correspondence with four wheels at the front left, front right, rear left, and rear right of said vehicle.

8. A vehicle height control apparatus as claimed in claim 4, wherein said vehicle height detecting means comprises four vehicle height sensors respectively arranged to detect the vehicle height at four different positions of said four wheels.

* * * * *